L. A. GROSCLAUDE.
Pawl and Ratchet.

No. 210,251. Patented Nov. 26, 1878.

Witnesses.

Louis Augustus Grosclaude
Inventor.
By atty.

UNITED STATES PATENT OFFICE.

LOUIS A. GROSCLAUDE, OF GENEVA, SWITZERLAND.

IMPROVEMENT IN PAWL AND RATCHET.

Specification forming part of Letters Patent No. 210,251, dated November 26, 1878; application filed November 1, 1878.

*To all whom it may concern:*

Be it known that I, LOUIS AUGUSTE GROSCLAUDE, of Geneva, Switzerland, have invented an Improvement in Pawl and Ratchet, of which the following is a specification:

In ratchet-wheels and pawls of ordinary construction the pawls are usually pressed against the teeth of the ratchet-wheel or racks by a spring or weight in such a manner that when the ratchet-wheel or rack is moved forward under the pawl, or when the pawl is moved backward over the ratchet-wheel, the former is made to fall with a blow into the recesses between the teeth, producing an unpleasant jarring noise, and subjecting both the pawl and the ratchet-wheel to wear.

According to my present invention I obviate these defects by the following construction: In place of the ordinary spring or weight acting on the back of the pawl, I provide the latter with a short tail or projection beyond its pin or fulcrum, to which tail is fixed a spring that passes between the inner face of the pawl and the teeth of the ratchet, and rests upon the latter in such a manner as to keep the pawl raised out of contact with the teeth while the former is being moved backward over the latter, or while the ratchet-teeth are moved forward under the pawl; but as soon as the one or the other part is moved in the contrary direction to that above mentioned, the free end of the spring in abutting against the angle of the tooth in front of it has a pressure put upon it, whereby it forces the tail or projection of the pawl upward, and thus causes the pawl to engage with the teeth of the ratchet-wheel or rack.

Figure 1:
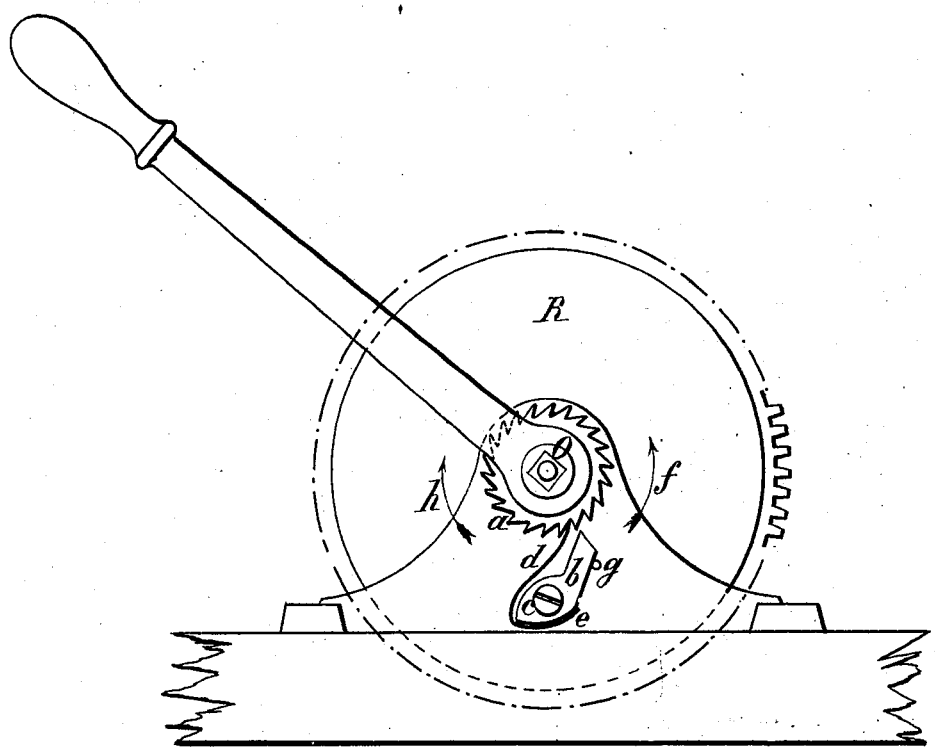
Figure 2:
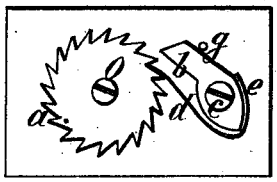
Figure 3:
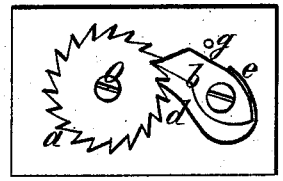

The accompanying drawing shows, Figure 1, one of the various modes of applying my said invention, which, however, is equally applicable to every other arrangement of movable or fixed pawls acting against ratchet-teeth or cogs of wheels or racks. Fig. 2 shows separately the click-work, the click uplifted, and Fig. 3 the same click-work, the click meshing with the teeth.

The axis O of the barrel carries a ratchet-wheel, $a$, in conjunction with which operates the fixed retaining-pawl $b$, pivoted at $c$. This pawl has a spring, $d$, fixed at $e$, and having its other end free. When the barrel is wound up, being turned in the direction of the arrow $f$, the backs of the teeth press the spring $d$, and consequently also the pawl $b$, outward, the play of the latter being limited by the pin $g$. As the backs of the teeth slide over the spring, there is practically no noise, the pawl $b$ only touching the teeth when it is required to engage with them for preventing the return motion of the barrel. As soon as the ratchet-wheel commences to move backward its teeth act against the spring $d$ in the direction of the arrow $h$, whereby the spring is made to press the pawl into the teeth of the ratchet-wheel, thus arresting the motion of the latter.

Not only does this construction avoid all noise, but also the teeth of the ratchet do not become worn, as they are not subject to the constant friction of the pawl, as in the ordinary arrangement, and they cannot break, because the pawl always acts upon the entire surface of a tooth when it retains it. This arrangement may also be applied in cases where the pawls are made to engage with the teeth of the wheel R of the barrel itself, serving as ratchet.

Having thus described the nature of my invention, and in what manner the same is to be performed, I claim—

The combination of a toothed ratchet, a hinged pawl, and a spring attached to the tail of the pawl, extending between the pawl and ratchet, and so as to rest upon said ratchet and support the pawl when the ratchet is moving from the pawl or the pawl from the ratchet, but draw the pawl into action when the movement is reversed, substantially as described.

In testimony whereof I have signed my name to this specification before two subscribing witnesses.

L. A. GROSCLAUDE.

Witnesses:
ROBT. M. HOOPER,
CHARLES MARDELET.